United States Patent
Mori

(10) Patent No.: US 12,515,704 B2
(45) Date of Patent: Jan. 6, 2026

(54) DRIVER-ASSISTANCE CONTROL APPARATUS, DRIVER-ASSISTANCE CONTROL METHOD, AND DRIVER-ASSISTANCE CONTROL PROGRAM

(71) Applicant: DENSO CORPORATION, Kariya (JP)

(72) Inventor: Takuya Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 18/463,984

(22) Filed: Sep. 8, 2023

(65) Prior Publication Data

US 2023/0415778 A1    Dec. 28, 2023

Related U.S. Application Data

(63) Continuation of application No. PCT/JP2021/046523, filed on Dec. 16, 2021.

(30) Foreign Application Priority Data

Mar. 10, 2021    (JP) .................................. 2021-038565

(51) Int. Cl.
*B60W 60/00*    (2020.01)
*B60W 50/02*    (2012.01)

(52) U.S. Cl.
CPC .... *B60W 60/0015* (2020.02); *B60W 50/0205* (2013.01); *B60W 2420/403* (2013.01); *B60W 2554/4041* (2020.02); *B60W 2556/45* (2020.02)

(58) Field of Classification Search
CPC ............. B60W 50/0205; B60W 60/00; B60W 60/0015; B60W 2420/403; B60W 2554/4041; B60W 2556/45; G08G 1/01

USPC ......................................................... 701/23
See application file for complete search history.

(56) References Cited

U.S. PATENT DOCUMENTS

| | | |
|---|---|---|
| 2018/0157272 A1 | 6/2018 | Suzuki |
| 2020/0117190 A1* | 4/2020 | Schmitt ................ G05D 1/0061 |
| 2020/0213581 A1* | 7/2020 | Lu ........................... H04N 23/71 |
| 2020/0226790 A1* | 7/2020 | Alvarez ................. G01S 13/865 |
| 2020/0336541 A1* | 10/2020 | Naderi Alizadeh .. G05D 1/0088 |

(Continued)

FOREIGN PATENT DOCUMENTS

| | | | | |
|---|---|---|---|---|
| DE | 112012006226 B4 * | 10/2020 | ........... | B62D 15/029 |
| EP | 3703028 A1 * | 9/2020 | ............. | G08G 1/087 |

(Continued)

*Primary Examiner* — Atul Trivedi
(74) *Attorney, Agent, or Firm* — Maschoff Brennan

(57) ABSTRACT

A driver-assistance control apparatus which deals with information derived from a selected vehicle moving in an autonomous driving mode as essential main information and information derived from a plurality of information source devices disposed outside the selected vehicle as sub-information. The driver-assistance control apparatus obtains position information about the selected vehicle, searches a selected information source device which is one of the information source devices which has position information about the selected vehicle, and checks the position information, as derived from the selected information source device, against position information about the selected vehicle which is correct to determine whether the position information derived from the selected information source device is correct.

9 Claims, 5 Drawing Sheets

(56) References Cited

U.S. PATENT DOCUMENTS

| | | | | |
|---|---|---|---|---|
| 2020/0342756 A1* | 10/2020 | MacKenzie | ........ | B60W 50/0098 |
| 2020/0342760 A1* | 10/2020 | Vassilovski | ............ | G05D 1/693 |
| 2020/0357282 A1* | 11/2020 | Imanishi | ................ | G08G 1/166 |
| 2020/0409362 A1* | 12/2020 | Long | ..................... | B60W 50/14 |
| 2021/0004622 A1* | 1/2021 | We | ....................... | G06V 20/588 |
| 2021/0039671 A1* | 2/2021 | Kim | ..................... | G06V 20/588 |
| 2021/0039674 A1* | 2/2021 | Kim | ................... | G01C 21/3819 |
| 2021/0039675 A1* | 2/2021 | Lee | .................... | G01C 21/3889 |
| 2021/0053575 A1* | 2/2021 | Bielby | .................. | B60W 50/02 |
| 2021/0063167 A1* | 3/2021 | Groh | ................. | B60W 60/0059 |
| 2021/0221389 A1* | 7/2021 | Long | ................... | B60W 30/182 |
| 2021/0309254 A1* | 10/2021 | Murahashi | ........ | B60W 60/0015 |
| 2021/0312725 A1* | 10/2021 | Milton | ................... | G07C 5/008 |
| 2022/0170752 A1* | 6/2022 | Beaurepaire | ...... | B60W 50/0205 |
| 2022/0324468 A1 | 10/2022 | Ishikawa | | |
| 2023/0351769 A1* | 11/2023 | Wu | ..................... | G06V 10/762 |
| 2024/0140428 A1* | 5/2024 | Weiser | .................. | G08G 1/096 |
| 2024/0409089 A1* | 12/2024 | Xiao | ..................... | G06V 20/58 |

FOREIGN PATENT DOCUMENTS

| | | |
|---|---|---|
| JP | 2010-061435 A | 3/2010 |
| JP | 2016-224867 A | 12/2016 |
| WO | 2021/049233 A1 | 3/2021 |

* cited by examiner

FIG.4

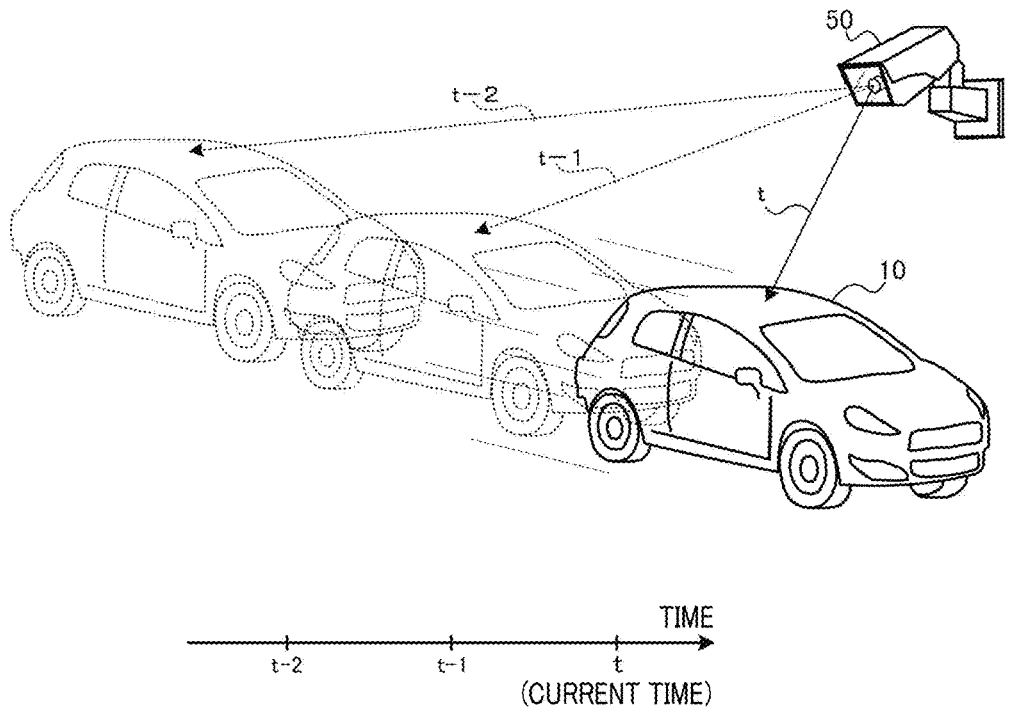

FIG.5A

INFORMATION FROM SELECTED
VEHICLE (CORRECT VALUE)

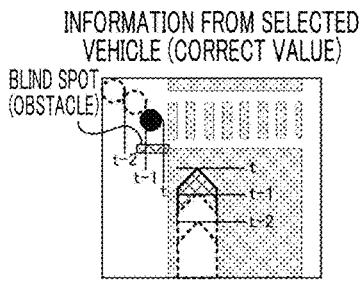

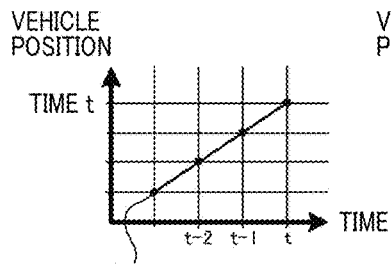

SELECTED VEHICLE
(SUBJECT VEHICLE)

FIG.5B

INFORMATION FROM SELECTED
INFRASTRUCTURE CAMERA (CORRECT)

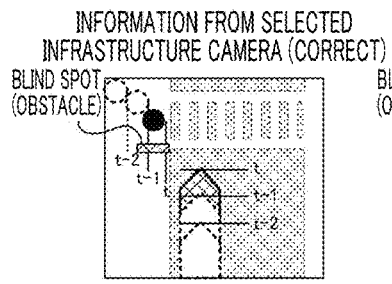

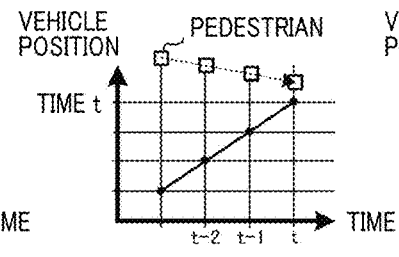

OPERATING PROPERLY

FIG.5C

INFORMATION FROM SELECTED
INFRASTRUCTURE CAMERA (ERROR)

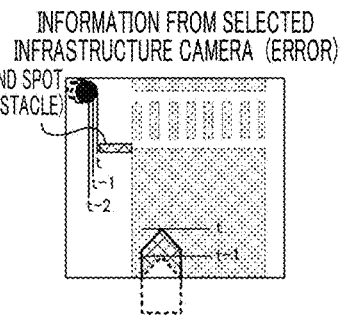

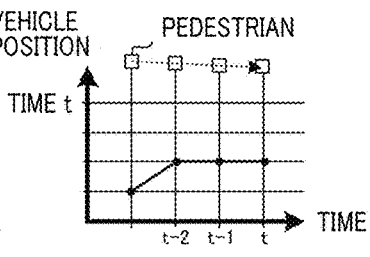

MALFUNCTIONING

OPERATING PROPERLY : PEDESTRIAN (□)APPROACHING VEHICLE (PRESENCE OF MATCHED INFORMATION)
MALFUNCTIONING: PEDESTRIAN (□) NOT APPROACHING VEHICLE (ABSENCE OF MATCHED INFORMATION

DRIVER-ASSISTANCE CONTROL APPARATUS, DRIVER-ASSISTANCE CONTROL METHOD, AND DRIVER-ASSISTANCE CONTROL PROGRAM

CROSS REFERENCE TO RELATED DOCUMENT

The present application claims the benefit of priority of Japanese Patent Application No. 2021-038565 filed on Mar. 10, 2021, the disclosure of which are incorporated in its entirety herein by reference.

TECHNICAL FIELD

This disclosure relates generally to a driver-assistance control apparatus, a driver-assistance control method, and a driver-assistance control program for vehicles which are designed to detect a malfunction of an output device of an information source which works to monitor surroundings of a subject vehicle in an autonomous driving mode.

BACKGROUND ART

In recent years, the development of self-driving technologies for moving objects, especially, automobiles has been advanced.

With the above development of self-driving vehicles, fail-operational technologies are also being developed to ensure the safety of vehicles in the event of an abnormality or a malfunction of systems installed in the vehicle during the autonomous driving mode.

One of the fail-operational technologies is known to operate a moving object from a remote location to avoid an area where it is impossible to operate the moving object in an autonomous driving mode and move it to an area where it is possible to operate the moving object in the autonomous driving mode to resume the autonomous driving of the moving object in a case where operation programs are not prepared in advance to continue the autonomous driving of the moving object.

Widening an area where it is possible to perform the automated driving essentially requires obtaining surroundings information (e.g., information on traffic flow) from an information source device installed on or around a road where a subject vehicle is traveling in addition to information derived from a camera or a radar installed in the subject vehicle.

As the information source device, a monitoring camera installed around a road or at an intersection of a road may be used.

Patent literature 1 teaches, as techniques for deriving the surroundings information, sensors disposed on a road at a given interval away from each other. The sensors are equipped with functions to count the number of passing vehicles on the road (i.e., traffic volume) or the occupation time of vehicles on the road.

The information source device, such as a vehicle detection sensor, is an information source which is essential to secure safety in automated driving of vehicles. The malfunction or failure in operation of the information source device, therefore, exerts significant adverse influence on transportation systems.

Patent Literature 1 also teaches, as a technique for detecting a malfunction of the above-described vehicle detection sensor, use of traffic flow on a road, as calculated based on information about trajectories of travel of vehicles moving on the road which are transmitted from the vehicles, to determine the validity of information about traffic flow (e.g., the number of moving vehicles) on the road, as measured by a vehicle detection sensor installed on the road.

Specifically, when a deviation of the calculated traffic flow from the measured traffic flow is greater than a given value, it is determined that the vehicle detection sensor is malfunctioning.

PRIOR ART DOCUMENT

Patent Literature

Patent Literature 1 Japanese Patent First Publication No. 2010-061435.

SUMMARY OF THE INVENTION

In the above-described system, malfunction of the vehicle detection sensor is detected using the deviation of the calculated traffic flow from the measured traffic flow, so that the accuracy of such malfunction detection depends upon the reliability of the calculation. It is, thus, difficult to ensure the stability in detection of the malfunction with high accuracy.

It is an object of this disclosure to provide a driver-assistance control apparatus, a driver-assistance control method, and a driver-assistance control program which are capable of providing surroundings information essential for automated driving of vehicles to detect a malfunction or a failure in operation of an information source device with high accuracy.

The first mode in this disclosure is to provide a driver-assistance control apparatus which provides driving assistance for a selected vehicle using essential main information derived from the selected vehicle moving in an autonomous driving mode and sub-information delivered from a plurality of information source devices disposed outside the selected vehicle. The driver-assistance control apparatus comprises: (a) an information obtainer which obtains position information about the selected vehicle; (b) a search unit which searches a selected information source device which is one of the information source devices which has position information about the selected vehicle; and (c) a determiner which works to check the position information, as derived from the selected information source device, against position information about the selected vehicle which is correct to determine whether the position information derived from the selected information source device is correct.

The second mode in this disclosure is to provide a driver-assistance control method which provides driving assistance for a selected vehicle using essential main information derived from the selected vehicle moving in an autonomous driving mode and sub-information delivered from a plurality of information source devices disposed outside the selected vehicle. The driver-assistance control method comprises: obtaining position information about the selected vehicle; searching a selected information source device which is one of the information source devices which has position information about the selected vehicle; and checking the position information, as derived from the selected information source device, against position information about the selected vehicle which is correct to determine whether the position information derived from the selected information source device is correct.

The third mode in this disclosure is to provide a driver-assistance control program which actuates a computer to execute portions of the above-described driver-assistance control apparatus.

BENEFICIAL ADVANTAGE OF THE INVENTION

This disclosure is to provide environmental information essential for autonomous driving of a vehicle to ensure accurate diagnosis of malfunctions of information source devices.

BRIEF DESCRIPTION OF THE DRAWINGS

The above object, other objects, features, and advantages of or offered by this disclosure will be understood more fully from the detailed description given hereinbelow and from the accompanying drawings.

In the drawings:

FIG. 4 is a perspective view which illustrates an infrastructure camera which works to capture an image of a moving vehicle;

FIGS. 5(A), 5(B), and 5(C) are plane views each of which illustrates locations of a vehicle and an infrastructure camera and characteristic views each of which demonstrates time-series positions of the vehicle.

EMBODIMENT FOR CARRYING OUT THE INVENTION

Figure 1:
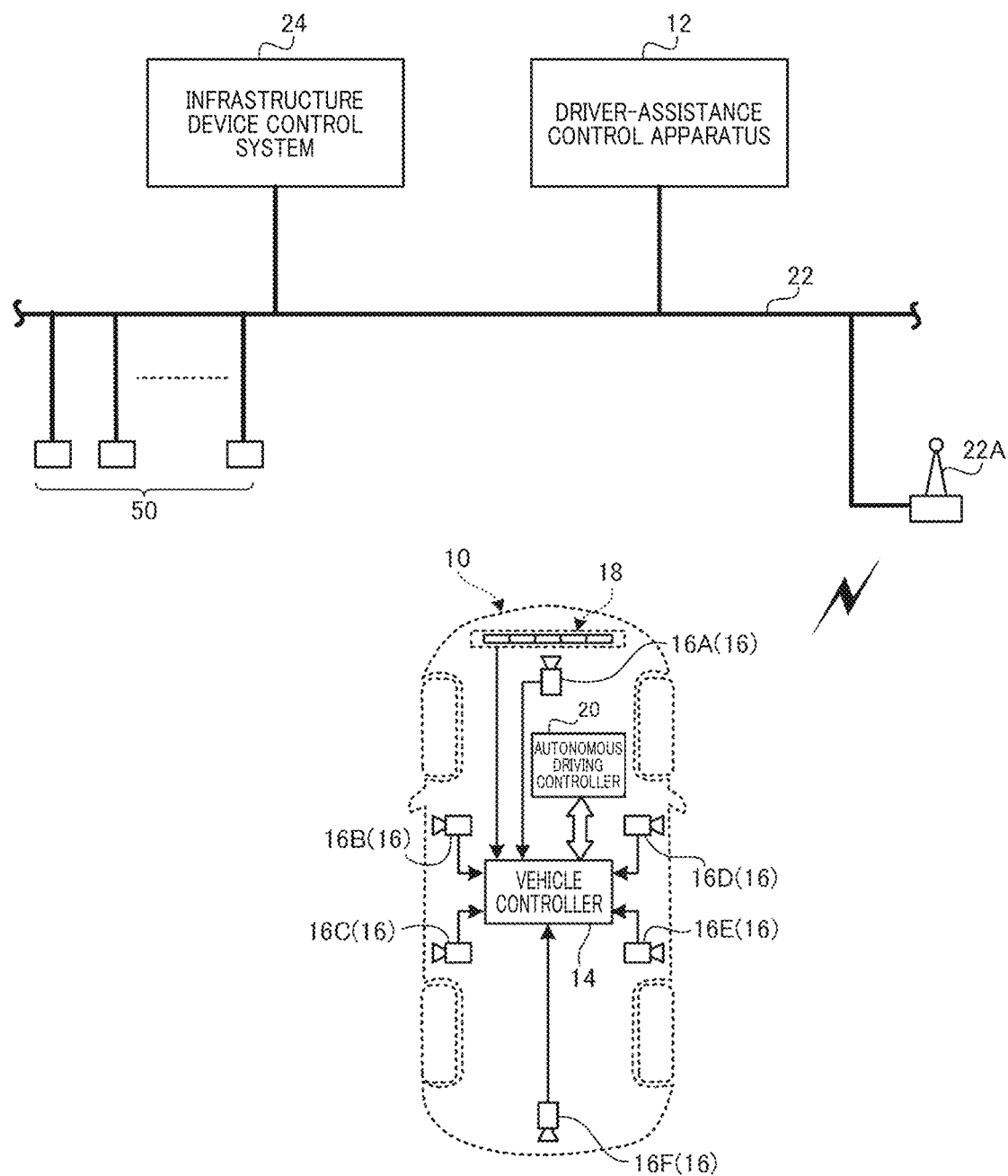
FIG. 1 is a schematic view which illustrates a driver-assistance system which includes a driver-assistance control apparatus according to an embodiment which works to assist an operator or driver in vehicles.

FIG. 1 is a schematic view of a driver-assistance system which includes the driver-assistance control apparatus 12 according to the embodiment which works to assist an operator or driver in each of the vehicles 10 (only one is illustrated for the brevity of disclosure) in driving a corresponding one of the vehicles 10.

Each of the vehicles 10 has the vehicle controller 14 and the autonomous driving controller 20 installed therein. The autonomous driving controller 20 functions mainly in an autonomous driving mode and also serves as an information gathering controller in this disclosure.

The vehicle controller 14 works to control operation of a power train including an engine and operation of an electrical system performing malfunction diagnosis using outputs from various sensors detecting conditions of given parts of the vehicle 10.

The vehicle controller 14 connects with the camera group 16 working to capture an image of surroundings of the vehicle 10. The camera group 16, as illustrated in FIG. 1, includes the front camera 16A, the left front camera 16B, the left back camera 16C, the right front camera 16D, the right back camera 16E, and the back camera 16F. The vehicle controller 14 also connects with the radar group 18 including a plurality of millimeter-wave radars and a LIDAR(s).

The autonomous driving controller 20 analyzes information, as derived from the vehicle controller 14, which is required for self-driving, for example, information obtained by the camera group 16 and the radar group 18 to identify a driving strategy navigating the vehicle 10 to a selected destination, and outputs instructions to the vehicle controller 14.

The autonomous driving controller 20 communicates with the driver-assistance control apparatus 12 through the wireless communication device 22A installed in the network 22.

The driver-assistance control apparatus 12 collects pieces of information about vehicle trip histories in the autonomous driving mode from the vehicles 10. The operator OP outputs instructions for driver assistance on demand (see FIG. 2).

The infrastructure device control system 24 connects with the network 22.

The infrastructure device control system 24 aggregates pieces of information from information source devices.

The information source devices may be implemented by security camaras installed fixedly. "installed fixedly" means that each of the monitoring cameras has an optical axis along which an image is captured and which is stationary, in other words, it has a stationary housing fixedly secured.

Figure 3A:
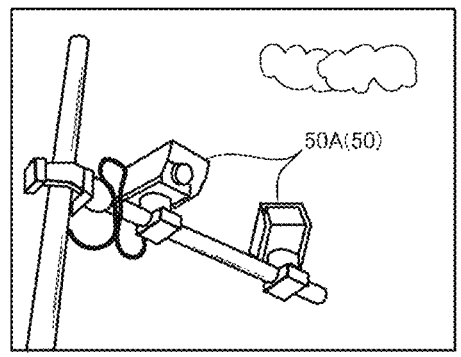
FIG. 3A is a perspective view which demonstrates an example of installation of infrastructure cameras that are information source devices in an embodiment.

Specifically, the monitoring cameras 50A are, as demonstrated in FIG. 3A, installed around an intersection of a road.

Figure 3B:
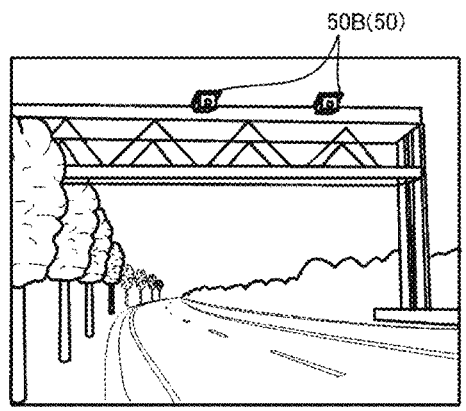
FIG. 3B is a perspective view which demonstrates a second example of installation of infrastructure cameras that are information source devices in an embodiment.

The monitoring cameras 50B are, as illustrated in FIG. 3B, arranged across a plurality of lanes on a road to visually monitor a volume of surrounding traffic on the road.

Figure 3C:
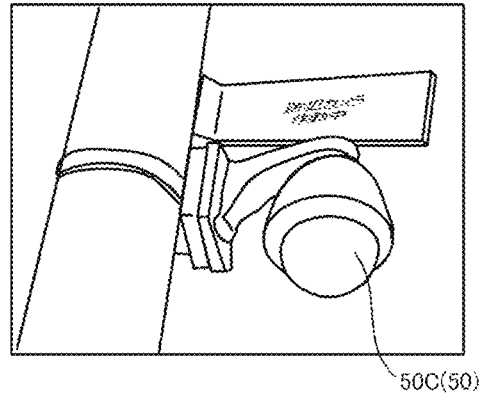
FIG. 3C is a perspective view which demonstrates a third example of installation of an infrastructure camera that is an information source device in an embodiment.

The monitoring camera 50C is, as illustrated in FIG. 3C, also installed on a store or a building on the side of a road for the purpose of crime-prevention.

Figure 3D:
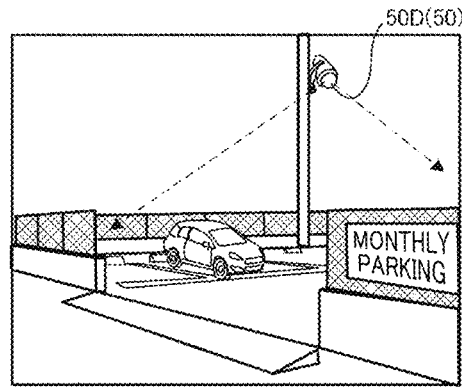
FIG. 3D is a perspective view which demonstrates a fourth example of installation of an infrastructure camera that is an information source device in an embodiment.

The monitoring camera 50D is, as illustrated in FIG. 3D, also installed on a car park on the side of a road to monitor a parking area or an entrance of the car park.

The following discussion will refer to the monitoring cameras 50A, 50B, 50C, and 50D as the information source devices which deliver monitored information (e.g., captured images) at least to the infrastructure device control system 24.

The information source devices may alternatively be implemented by cameras which are capable of capturing an image of a region in which each of the vehicles 10 travels instead of the cameras illustrated in FIGS. 3A to 3D.

All the infrastructure cameras 50 need not necessarily be connected to the infrastructure device control system 24.

The driver-assistance control apparatus 12 is, as can be seen in FIG. 1, capable of deriving real-time road information and the time and weather when the road information has been obtained from the infrastructure device control system 24 as necessary.

When any event occurs which adversely affects or disturbs the autonomous driving of one of the vehicles 10 while the vehicle 10 is moving in the autonomous driving mode, the driver-assistance control apparatus 12 may receive suitable driving support from the operator OP (see FIG. 2) monitoring the vehicle 10 in order to enable the vehicle 10 to continue to travel in the autonomous driving mode.

Specifically, the driver-assistance control apparatus 12 selects one(s) of various pieces of information including those outputted from the vehicle 10 and the infrastructure cameras 50 located around the vehicle 10 which are associated with the above disturbance to the autonomous driving of the vehicle 10 and then outputs required advice to the vehicle 10.

The information from the infrastructure cameras 50 is as essential as that from the vehicle 10 in order for the driver-assistance control apparatus 12 to give the vehicle 10 the required advice.

It is, however, difficult for the infrastructure device control system 24 to determine whether each of all the infrastructure cameras 50 dotted around the road is properly operating. In other words, the driver-assistance control apparatus 12 may receive information from one of the infrastructure cameras 50 which is now malfunctioning.

In order to alleviate the above problem, when the selected vehicle 10 that is one of the vehicles 10 is moving near the selected infrastructure camera 50 that is one of the infrastructure cameras 50, the driver-assistance control apparatus 12 in this embodiment works to analyze pieces of information about the position of the selected vehicle 10 (e.g., information about a locus of movement of the selected vehicle 10 along a time axis) which are outputted both from the selected vehicle 10 and the selected infrastructure camera 50 to determine whether the selected infrastructure camera 50 is now malfunctioning.

The above malfunction detection is achieved on the assumption that the positional information (e.g., information about the locus of movement of the vehicle 10) outputted from the selected vehicle 10 is correct.

For instance, the selected vehicle 10 which is moving in the autonomous driving mode from a broken line to a solid line demonstrated in FIG. 4, as will be described later in detail, has information about its own position which is transmitted to the driver-assistance control apparatus 12.

The selected infrastructure camera 50 illustrated in FIG. 4 monitors or captures an image of the selected vehicle 10 moving from the broken line to the solid line and outputs the image to the infrastructure device control system 24. The infrastructure device control system 24 analyzes the output from the selected infrastructure camera 50 to obtain information about the position of and a locus of movement of the selected vehicle 10.

The driver-assistance control apparatus 12 in this embodiment compares between the position (which will also be referred to as the selected vehicle position information) of the selected vehicle 10 derived from the vehicle 10 and the position (which will also be referred to as infra-side vehicle position information) of the vehicle 10 derived from the infrastructure device control system 24 to determine whether the infrastructure cameras 50 is now malfunctioning or not.

Figure 2:
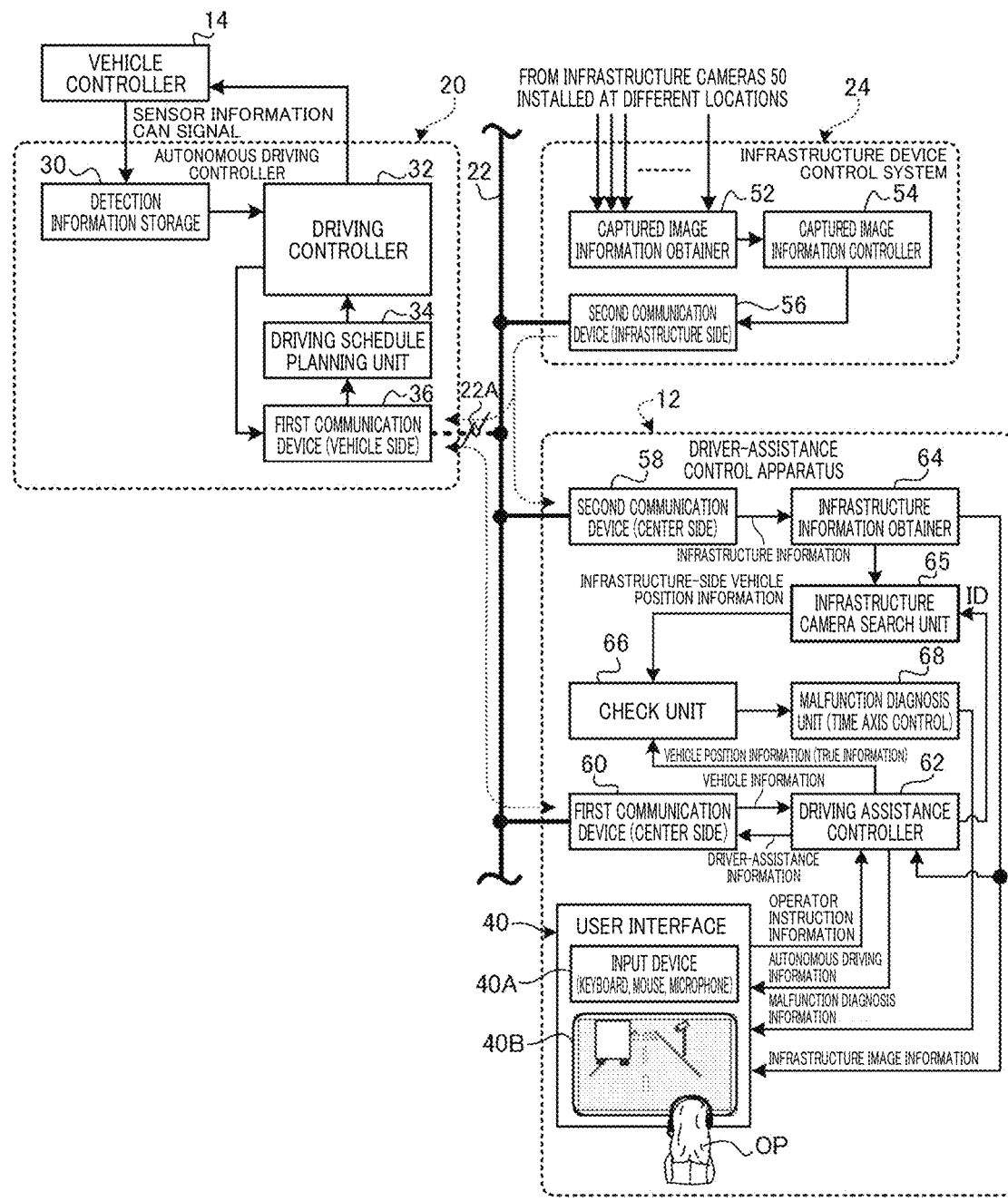
FIG. 2 is a block diagram which illustrates control blocks in a driver-assistance system in an embodiment to control a driver-assistance mode of vehicles and perform determination of whether a malfunction is occurring in information source devices disposed at different locations along a road.

FIG. 2 is a block diagram which illustrates control blocks in a driver-assistance system including the driver-assistance control apparatus 12, the autonomous driving controller 20, and the infrastructure device control system 24 to control a driver-assistance mode of each of the vehicles 10 and perform determination of whether a malfunction is occurring in each of the information source devices (i.e., the infrastructure cameras 50) located along the road. The block diagram in FIG. 2 demonstrates, as an example, functional blocks in the driver-assistance system. The driver-assistance system in this embodiment may alternatively be designed to have another combination of functional blocks as long as it achieves the object of this disclosure. All or part of the functional blocks in FIG. 2 may be realized in software form by executing a program using a microcomputer.

Autonomous Driving Controller 20

The detection information storage 30 receives through the vehicle controller 14 pieces of information about detections made by the camera group 16 and the radar group 18 and a diagnostic code provided in the form of a CAN (Controller Area Network) signal and stores them. The detection information storage 30 is also connected to the driving controller 32 and outputs a required one(s) of the pieces of information about the detections as cruise control information to the driving controller 32.

The driving controller 32 connects with the driving schedule planning unit 34.

The driving schedule planning unit 34 obtains driver-assistance information through the first communication device 36 (installed in the vehicle 10) from the first communication device 60 (installed in the center) of the driver-assistance control apparatus 12, plans a driving schedule, and outputs the driving schedule to the driving controller 32.

The driving controller 32 may request the driver-assistance control apparatus 12 to support or assist in driving the vehicle 10 through the first communication device 36.

An answer to the request of the driving assistance is received by the driving schedule planning unit 34 through the first communication device 36. The driving schedule planning unit 34 then modifies, alters, or cancels the driving schedule and informs the driving controller 32 of such a fact.

Infrastructure Device Control System 24

The infrastructure device control system 24, as can be seen in FIG. 2, includes the captured image information obtainer 52 which obtains or collects pieces of information about images captured by the information source devices, for example, the infrastructure cameras 50 disposed along the road.

The captured image information obtainer 52 connects with the captured image information controller 54 which calculates the position of an object captured by each of the infrastructure cameras 50 and outputs it to the driver-assistance control apparatus 12 through the second communication device 56 installed in the infrastructure device control system 24. Although not illustrated, pieces of information managed by the infrastructure device control system 24 are also outputted to various facilities other than the driver-assistance control apparatus 12.

Driver-Assistance Control Apparatus 12

The driver-assistance control apparatus 12, as clearly illustrated in FIG. 2, includes the first communication device 60.

The first communication device 60 is paired with the first communication device 36 of the autonomous driving controller 20 and works to transmit information therebetween.

The first communication device 60 obtains information about the autonomous driving of the vehicle 10 through the first communication device 36 and outputs it to the driving assistance controller 62.

The driving assistance controller 62 outputs information on images captured by the camera group 16, information on detections made by the radar group 18, and vehicle information on autonomous driving of the vehicle 10 derived by information, such as high-accuracy map information on the vehicle 10, to the user interface 40. The driving assistance controller 62 may return results of analysis (e.g., results of AI analysis) of the vehicle information as information about driving assistance instructions.

The user interface 40 includes the input device 40A equipped with a keyboard, a mouse, and a microphone and the monitor 40B serving as an output device.

The user interface 40 is responsive to autonomous driving information received from the driving assistance controller 62 to display a real-time image of the site on the monitor 40B. The operator OP visually perceives the image on the monitor 40B.

The operator OP analyzes the image on the monitor 40B to determine how to assist the vehicle 10 and then inputs driving assistance information using the input device 40A which is transmitted to the driving assistance controller 62.

The driving assistance controller 62 delivers driving assistance instruction information, as received from the input device 40A, to the autonomous driving controller 20 through the first communication device 60.

The second communication device 58 connects with the infrastructure information obtainer 64.

The infrastructure information obtainer 64 connects with the user interface 40. The user interface 40 works to output pieces of image information, as derived by the infrastructure information obtainer 64 from the infrastructure cameras 50, to the user interface 40. The operator OP is capable of additionally analyzing the pieces of image information from the infrastructure cameras 50 to provide the driving assistance instruction information to the vehicles 10 moving in the autonomous driving mode.

The infrastructure information obtainer 64 also connects with the infra-camera search unit 65 to analyze analyzes ID information about a selected one of the vehicles 10 (which will also be referred to as the selected vehicle 10), as derived from the driving assistance controller 62, and search one of the infrastructure cameras 50 (which will also be referred to as the selected infrastructure camera 50) which is now monitoring the selected vehicle 10.

The infra-camera search unit 65 connects with the check unit 66 and outputs information (which will also be referred to as selected vehicle position information) about the position of the selected vehicle 10 on the image captured by the selected infrastructure camera 50 to the check unit 66.

The check unit 66 determines the vehicle position information derived from the driving assistance controller 62 as representing a correct position of the selected vehicle 10 and checks it against the infra-side vehicle position information (e.g., using two-dimensional coordinates).

The check unit 66 connects with the malfunction diagnosis unit 68 and outputs a result of the check to the malfunction diagnosis unit 68.

The malfunction diagnosis unit 68 manages a time axis, that is, calculates a positional difference at the current time t to determine whether the selected infrastructure camera 50 is malfunctioning, so that the position information is erroneous. The malfunction diagnosis unit 68 may analyze results of the check at a plurality of past times, i.e., times t−1, t−2, . . . to determine whether the selected infrastructure camera 50 is malfunctioning or not (which will also be referred to below using FIGS. 4 and 5).

The malfunction diagnosis unit 68 is, as described above, configured to determine whether the selected infrastructure camera 50 is malfunctioning or not, but may alternatively diagnose whether the selected infrastructure camera 50 is properly operating or not. The malfunction diagnosis unit 68 outputs the result of determination to the user interface 40 to inform the operator OP that the reliability in operation of the selected infrastructure camera 50 is low.

When perceiving that the selected infrastructure camera 50 is malfunctioning using the information derived from the malfunction diagnosis unit 68, the operator OP determines the reliability in operation of the selected infrastructure camera 50 is low and then transmits the driving assistance instruction information. The determination that the reliability in operation of the selected infrastructure camera 50 is low may be made when the above positional difference is higher than a given threshold value which is predetermined in relation to the correct value (i.e., the vehicle position information derived from the driving assistance controller 62). The threshold value may alternatively be updated using histories of traffic accidents at a corresponding place and/or the speed of the selected vehicle 10.

FIG. 4 is a perspective view which demonstrates a positional relation between the selected vehicle 10 and the selected infrastructure camera 50.

When the vehicle 10 is, as illustrated in FIG. 4, moving on the road, the infra-camera search unit 65 identifies it as the selected vehicle 10 using the identification (ID) code derived from the driving assistance controller 62. The infra-camera search unit 65 then analyzes the information about the position of the selected vehicle 10 to select one of the infrastructure cameras 50 (i.e., the selected infrastructure camera 50) which is capturing an image of the selected vehicle 10.

The selected infrastructure camera 50 works to track the selected vehicle 10 to derive a locus of movement of the selected vehicle 10 and calculate positions of the selected vehicle 10 at a plurality of times (e.g., times t−2, t−1, and t) in time sequence where t is the current time.

When the selected vehicle 10 is, as demonstrated in FIG. 5(A), moving, information about the position of the selected vehicle 10 is transmitted from the autonomous driving controller 20 to the driver-assistance control apparatus 12. Such position information is used in the check unit 66 as representing the position of the selected vehicle 10 accurately (i.e., the correct position).

When the selected vehicle 10 lies in an image capturing range of the selected infrastructure camera 50, the infrastructure device control system 24 is capable of calculating the position of the selected vehicle 10 using the output of the selected infrastructure camera 50.

FIG. 5(B) demonstrates information about the position of the selected vehicle 10 when the value calculated by the infrastructure device control system 24 is correct. The position of the selected vehicle 10 in FIG. 5(B) agrees with that in FIG. 5(A).

For instance, when a pedestrian H exists in a blind spot of the selected vehicle 10 (see squares in FIG. 5(B)), it is possible to recognize the presence of the pedestrian H using the output from the selected infrastructure camera 50 and find that the pedestrian H is approaching the selected vehicle 10.

The information about the recognition of the pedestrian H (i.e., the position and speed of the pedestrian H) derived from the selected infrastructure camera 50 operating properly may be transmitted as it is to the selected vehicle 10, thereby enabling the selected vehicle 10 to assess a condition in front more accurately than in the absence of the information from the selected infrastructure camera 50.

FIG. 5(C) demonstrates the position of the selected vehicle 10 when the value calculated by the infrastructure device control system 24 is incorrect. The position of the selected vehicle 10 in FIG. 5(C) is different from that in FIG. 5(A).

Consequently, the actual position of the selected vehicle 10 deviates from the position of the selected vehicle 10 identified by the selected infrastructure camera 50, thus resulting in erroneous information about the pedestrian H identified by the selected infrastructure camera 50.

The operation of this embodiment will be described below with reference to a flowchart of FIG. 6.

Figure 6:
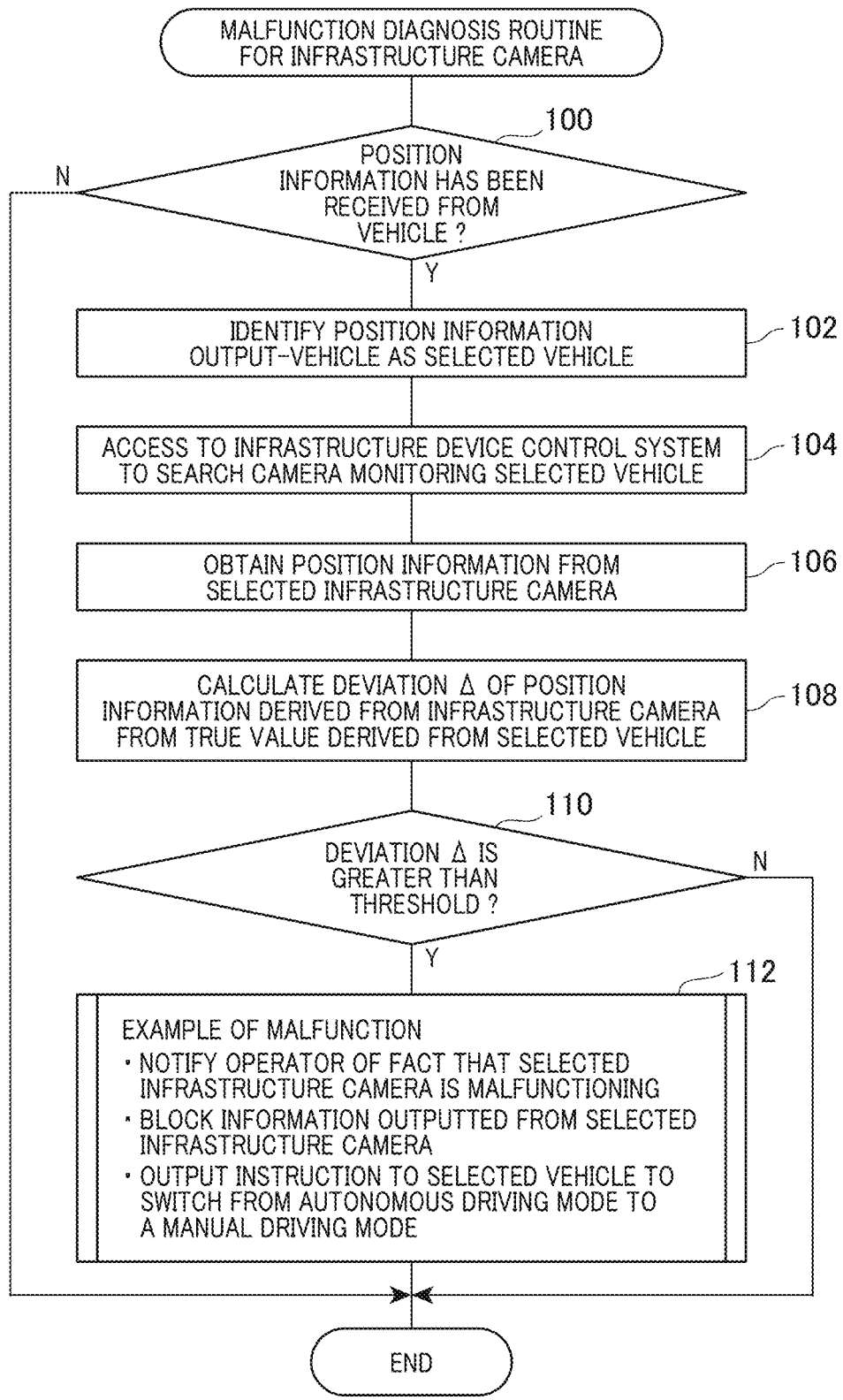
FIG. 6 is a flowchart of a sequence of malfunction diagnosis steps for an infrastructure camera according to an embodiment.

The flowchart in FIG. 6 represents a sequence of logical steps performing an infra-camera malfunction task or program in the driver-assistance control apparatus 12.

After entering the program, the routine proceeds to step S100 wherein it is determined whether the position information outputted from one of the vehicles 10 has been received. If a NO answer is obtained meaning that the position information has not yet been received, then the routine terminates. Alternatively, if a YES answer is obtained, then the routine proceeds to step S102 wherein the one of the vehicles 10 is identified as the selected vehicle 10 using the ID code. The routine proceeds to step S104.

In step S104, the infrastructure device control system 24 is accessed to search one of the infrastructure cameras 50 (i.e., the selected infrastructure camera 50) which is monitoring the selected vehicle 10. The routine then proceeds to step S106.

In step S106, the information about the position of the selected vehicle is derived from the infrastructure device control system 24. The routine then proceeds to step S108.

In step S108, the check unit 66 determines the position information derived from the selected vehicle 10 as indicating the correct position of the selected vehicle 10 and calculates a deviation Δ of the position of the selected vehicle 10 derived from the selected infrastructure camera 50 from the correct position.

The routine proceeds to step S110 wherein it is determined whether the deviation Δ, as calculated in step S108, is greater than a given value.

If a NO answer is obtained in step S110 meaning that the deviation Δ is in a permissible range, then the routine terminates.

Alternatively, if a YES answer is obtained meaning that the deviation Δ lies out of the permissible range, then the routine proceeds to step S112 wherein given malfunction countermeasures in the presence of the camera malfunction are made.

For instance, the malfunction measures made in step S112 include:
First Countermeasure To notify the operator OP of the fact that the selected infrastructure camera 50 is now malfunctioning;
Second Countermeasure To block the information outputted from the selected infrastructure camera 50; and
Third Countermeasure To output an instruction to the selected vehicle 10 to switch from the autonomous driving mode to the manual driving mod.

The malfunction countermeasures in step S112 may alternatively or additionally include another or other countermeasures made in parallel to the first to third countermeasures or each other.

This embodiment, as described above, calculates the positions of the selected vehicle 10 at a plurality of times (i.e., t−2, t−1, and t) and compares each of them with the correct position, but however, the driver-assistance control apparatus 12 may alternatively be designed to check the position of the selected vehicle 10 only one time to diagnose the selected infrastructure camera 50 or alternatively compare a locuse(es) of movement of the selected vehicle 10 which is derived from a plurality of pieces of the position information about the selected vehicle 10 including a plurality of time-series positions of the selected vehicle 10 derived from the autonomous driving controller 20 with that or those derived from the selected infrastructure camera 50 to diagnose the selected infrastructure camera 50. Such a locus comparison may be made only one time or a plurality of times in time sequence.

As apparent from the above discussion, each of the vehicles 10 moving in the autonomous driving mode is obtaining its own position which is essentially required to be correct for the autonomous driving of the vehicle 10. In other words, the position obtained by the selected vehicle 10 itself may be used as a correct position of the selected vehicle 10. Upon capturing of an image of the selected vehicle 10 by the selected infrastructure camera 50, the infrastructure device control system 24 calculates the position of the selected vehicle 10. The operator OP may use the position of the selected vehicle 10 calculated using the image derived by the selected infrastructure camera 50 as sub-information in remotely delivering the driving assistance instructions to the selected vehicle 10. The driver-assistance control apparatus 12 checks the position of the selected vehicle 10 derived from the selected infrastructure camera 50 against the position of the selected vehicle 10 obtained by itself (i.e., the correct position or value) and uses the position of the selected vehicle 10 derived from the selected infrastructure camera 50 as the sub-information required for the autonomous driving of the selected vehicle 10.

Usually, the driver-assistance control apparatus 12 is capable of covering a blind spot of the camera group 16 installed in the selected vehicle 10 in the absence of the malfunction of the selected infrastructure camera 50. Alternatively, when determining that the selected infrastructure camera 50 is malfunctioning, the driver-assistance control apparatus 12 may not use the position of the selected vehicle 10 derived using the selected infrastructure camera 50 as the sub-information and may work to provide safety-based driving assistance instructions to instruct the selected vehicle 10 to move at a reduced speed or stop momentarily.

The present disclosure has been described above on the basis of embodiments and modifications, but the embodiments of the invention described above are for facilitating the understanding of the present disclosure and do not limit the present disclosure. The present disclosure can be modified and improved without departing from the concept and the scope of the claims, and the present disclosure includes equivalents thereof.

What is claimed is:

1. A driver-assistance control apparatus which provides driving assistance for a selected vehicle using essential main information derived from the selected vehicle moving in an autonomous driving mode and sub-information delivered from a plurality of information source devices disposed on a road at fixed locations, the driver-assistance control apparatus comprising:
   an information obtainer which obtains position information about the selected vehicle;
   a search unit which searches a selected information source device which is one of the information source devices which has position information about the selected vehicle;
   a determiner which works to check the position information, as derived from the selected information source device, against position information about the selected vehicle which is correct to determine whether the position information derived from the selected information source device is correct; and a driving-assistance controller that performs one or more driver-assistance related operations based on whether the position information derived from the selected information source device is correct.

2. The driver-assistance control apparatus as set forth in claim 1, wherein the position information which is correct is derived from the selected vehicle.

3. The driver-assistance control apparatus as set forth in claim 1, wherein when determining that the selected information source device is malfunctioning, the determiner works to stop information obtained from the selected information source device from being used.

4. The driver-assistance control apparatus as set forth in claim 1, wherein the determiner works to check the position information, as derived from the selected information source device, against the position information about the selected vehicle which is correct at one or a plurality of times in time sequence or alternatively check a locus of movement of the selected vehicle derived from the position information from the selected information source device against that derived using the position information which is correct at one or a plurality of times in time sequence.

5. The driver-assistance control apparatus as set forth in claim 1, wherein the information source devices are implemented by infra cameras which are disposed on an autonomous driving road and have given monitoring ranges, respectively.

6. A driver-assistance control program which actuates a computer to execute portions of the driver-assistance control apparatus as set forth in claim 1.

7. The driver-assistance control apparatus of claim 1, wherein the one or more driver-assistance related operations include one or more malfunction countermeasures in response to the determiner determining that the position information derived from the selected information source is incorrect.

8. A driver-assistance control method which provides driving assistance for a selected vehicle using essential main information derived from the selected vehicle moving in an autonomous driving mode and sub-information delivered from a plurality of information source devices disposed on a road at fixed locations, the driver-assistance control method comprising:

obtaining position information about the selected vehicle;

searching a selected information source device which is one of the information source devices which has position information about the selected vehicle;

checking the position information, as derived from the selected information source device, against position information about the selected vehicle which is correct to determine whether the position information derived from the selected information source device is correct; and performing one or more driver-assistance related operations based on whether the position information derived from the selected information source device is correct.

9. The driver-assistance control method of claim 8, wherein the one or more driver-assistance related operations include one or more malfunction countermeasures in response to determining that the position information derived from the selected information source is incorrect.

* * * * *